Figure 1:
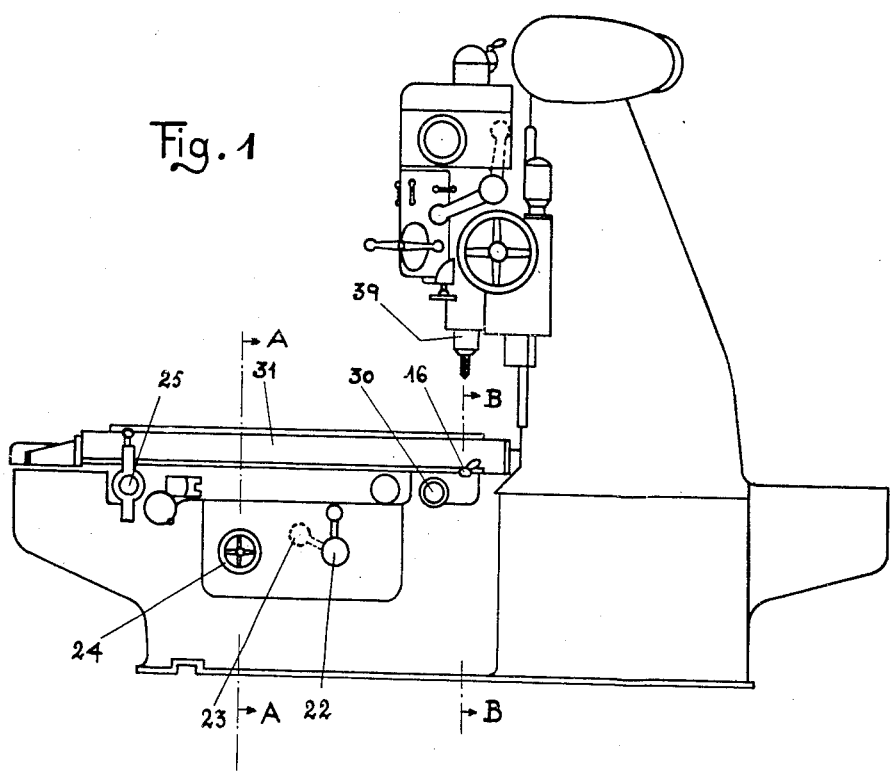

Feb. 16, 1943.　　　　F. TURRETTINI　　　　2,311,142
PRECISION MACHINE TOOL
Filed Feb. 11, 1942　　　3 Sheets-Sheet 1

Inventor
F. Turrettini
By Glascock Downing & Seebold
Attys

Feb. 16, 1943. F. TURRETTINI 2,311,142
PRECISION MACHINE TOOL
Filed Feb. 11, 1942 3 Sheets-Sheet 2

Inventor
F. Turrettini
By Glascock Downing Seebold Attys

Inventor
F. Turrettini
By Hascock Downing, Seebold
Attys

UNITED STATES PATENT OFFICE 2,311,142

PRECISION MACHINE TOOL

Fernand Turrettini, Bellevue-Geneva, Switzerland, assignor to Societe Genevoise d'Instruments de Physique, Geneva, Switzerland, a firm of Switzerland Application February 11, 1942, Serial No. 430,470
In Switzerland December 28, 1940

9 Claims. (Cl. 192—143)

The object of the present invention is a precision tool-machine, for instance a centre punching machine.

The centre punching machines must determine by means of very precise measuring means, the exact relation of the tool, mounted in the tool spindle of the machine, and of the piece to be wrought.

The precise measuring means used in the machines known to this day can be classified in four main types:

(1) Measuring by means of a micrometrical screw with graduated head.

(2) Measuring on a scale with a vernier sometimes with the adjunction of electrical contacts to stop the table in the required position.

(3) Measuring with length gauges with the adjunction of an indicator measuring the fraction of the smallest unit length gauge.

(4) Measuring by means of a microscope with reticle on a precision scale distinct from the organs controlling the movement of the table.

Known machines derived from the fourth type are generally equipped with a motorized control for bringing the table (or the tool spindle) quickly and approximately in position in checking its movement on an auxiliary scale easy to observe, and with a slow acting hand control for completing the displacement in making a very precise observation with the reticle microscope sighting the precision scale.

The precision tool-machine according to the present invention comprises at least one sliding table, which can be brought into a determined working position by first imparting to it a fast movement, followed by a slow movement. The tool-machine is characterized by an auxiliary scale, by a sliding index adjustable along the latter, by a device operated by this sliding index and effecting automatically the table's change-over from its fast movement to its slow movement, by an apparatus of precise setting comprising a fine graduation, a photo-electric cell facing this graduation, between both the latters a grid whose opaque parts and light admitting parts correspond to the tracing of the graduation and finally a source of light producing a beam which, after having passed the graduation and the grid, acts on the cell; by a device controlled by the latter and causing the table to stop automatically exactly in the required position and by a mechanism permitting to bias certain elements of the setting apparatus in relation with the others, in order to take into account the fractions of units in the precision setting, the whole with the purpose of reducing automatically the speed of the motorized control of the table when the latter comes near to its working position and to stop it automatically in this position.

The machine according to the invention avoids therefore the final adjustment by hand, existing in all the machines of the fourth type above, and the loss of time that results therefrom. It avoids at the same time the errors due to the personal factor of the operator sighting a precision graduation with a microscope. This is a considerable technical improvement, as the precision obtained is no more a function of the personal aptitudes of the operator and the continuity of the degree of precision is maintained when an operator is replaced by another, as is always the case in shift working.

Another merit of the invention is to accelerate the work with the machine by avoiding losses of time in the adjustments. This second advantage is also important. In fact, the centre punching machine proceeding in accordance with a rectangular coordinate system for the adjustment of the relative position of the tool carried by the tool spindle and of the piece to be wrought, there are thus always two adjustments to be made in two rectangular directions. With the machine according to the invention, the operator shall prepare the adjustment along one of the coordinates, operate a handle starting the table at full speed in the required direction, and then he will take care of the adjustment along the other coordinate whilst the table arrives automatically and accurately in the position defined by the first adjustment.

Figure 2:
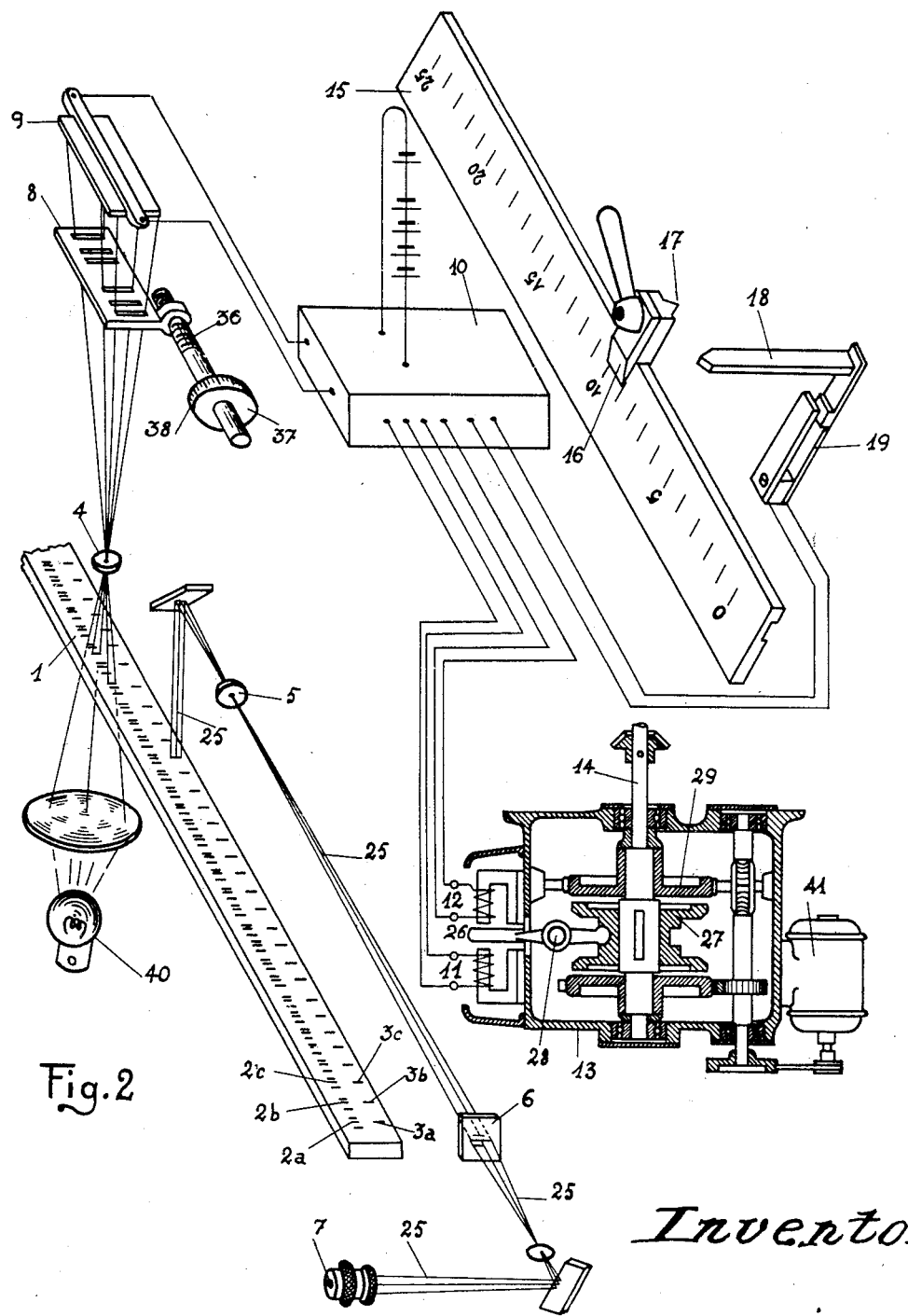
Figure 3:
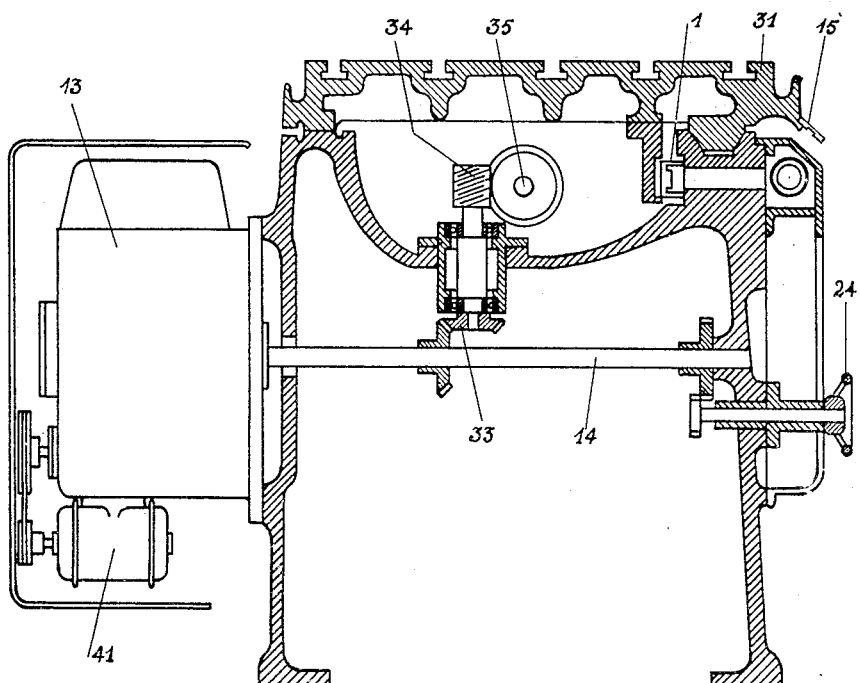
Figure 4:
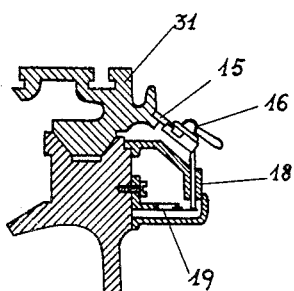

The accompanying drawings represent by way of example an embodiment of the present invention. Fig. 1 is a general view in elevation; Fig. 2 shows some details in a larger scale and, in part, schematically; Figs. 3 and 4 are cross-sections by A—A, respectively B—B of Fig. 1.

The machine shown comprises a sliding table 31, intended to carry the piece to be wrought, and movable from left to right and inversely, in Fig. 1, as well as a tool spindle 39 movable perpendicularly to the table movement (and moreover vertically for tool feed). An electric motor 41 drives across a gear box 13 the main spindle 14 which actuates the gears 33—34 of the translation screw 35 of the table.

The precision scale 1 (see Figs. 2 and 3) is fixed to the table 31; 2a, 2b, 2c, etc., are the groups of fine lines disposed at irregular intervals, between lines of the same group, but identical in each group. 3a, 3b, 3c are the graduation lines that must be sighted in a visual microscope 25 comprising the objective 5, the reticle and micrometer 6 and the ocular 7; these lines can be an extension of one of the lines of each group, provided it is always the same line of the group.

4 is the objective of the photo-electric setting device, whose source of light is in 40.

8 is a grid that reproduces by transparency on an opaque background the image of groups 2a, 2b, etc., in the required scale. This grid can move itself parallely to the scale 1 by small amounts determined with precision by means of the micrometrical screw 36 provided with a drum 37 which bears a graduation.

9 is a photo-electric cell connected by electric lines to an amplifying relay 10 which, by acting on electro-magnets 12 and 11 of the gear box 13 permits to drive the table at high speed, or to stop it. In the circuit of the photo-electric cell is placed a switch, not shown, which only allows the action of the photo-electric cell on the gear box when the last but one of the groups of lines 2a, 2b, 2c, in the direction of movement of the table, has passed in front of the photo-electric cell, the whole in order to cause the table to stop automatically under the action of the required group of lines at the exclusion of the others. This switch is operated by the movement of the table, or by the movement of the driving organs of the latter.

The auxiliary scale 15 fixed to the table is used to determine approximately the stopping position of the latter. It is provided with a sliding index 16 presenting a heel 17.

The operation is as follows:

Let us suppose that the slits of the grid 8 stand exactly in sight of the lines of the graduation 1, the table being at zero, and that, the divisions being in millimeters, it is required to bring the table to the measurement 900.40 mm. One shall bring the sliding index 16 on the division 900 of the scale 15 and, by turning the micrometrical screw 36, one shall give a bias of 0.40 mm. (taking into account the magnification of the objective 4) to the grid 8 in relation to the graduation 1; then, one shall put the handle 22 (Fig. 1) in position 23 (the handle 22 operates on the gear box 13 through means not described). The table will start at full speed towards the left.

When it will come near to the measurement 900 mm., the heel 17 of the sliding index 16 will touch the end of the rod 18 which, being thus depressed, will separate the contacts of the switch 19. This switch 19 is inserted in a circuit leading to the relay 10. The opening of the switch 19 thus switches off the current of the electro-magnet 12 and excites the electro-magnet 11. The armature 26, between the electro-magnets 11 and 12, will be applied against the electro-magnet 11. By pivoting around the pivot 28, it will apply the sliding sleeve 27 against the crown 29 which rotates at reduced speed.

The speed of rotation of the spindle 14 and consequently also the speed of translation of the table will be considerably decreased.

If the slowing down has to be operated in more than one phase, there will be more than one switch 19 and the gear box will include several rates of speed. These switches will act consecutively one after the other, the last one acting a few tenths of millimeters before the final stopping position.

The table coming now at a very low speed forward, one of the groups of lines 2ª, 2ᵇ, etc. will come into the field of the photo-electric sighter. Its image projected by the objective 4 on the grid 8 will cause a cell reaction which, through the relay 10, will cut out the current to the electro-magnet 11; the clutch pieces 27 and 29 are released and the table stops instantaneously.

Since the lines in the groups 2a, 2b and 2c are not equidistant, there is only one single very exactly defined position of the graduation, for each length unit division, in which these lines will be exactly in sight of the slits of the grid and will prevent any light from passing through the latter. One obtains thus a stop which is much more accurate than if there were only a single line, which should then be made considerably thicker in order to produce a cell reaction, because the superposition of a single thin line onto the grid might not be sufficient to produce a diminution of light apt to impress the photo-electric cell with reliability.

The machine comprises also, as any tool-machine, a hand control 24 enabling to give the table 31 a slow motion by hand. This motion will be used, for instance, to adjust the cutting depth of the tool, or also to bring in relation with the tool or its spindle the point of the piece to be wrought which shall be taken as origin of the coordinates. One shall then bring the table in this position by manoeuvring the handle 24 and read the values of the coordinates from the point of origin by means of the microscope 25. The ulterior changes of position of the table will then be obtained with the automatic device described above.

It is well understood that the same arrangement as used for the table 31 could also be applied to the sliding member carrying the tool spindle 39. It is also clear that the invention is not limited to what is shown in the drawings; in particular, in order to produce the fractional bias, one could displace, instead of the grid 8, the precision scale 1, the objective 4 or even a blade or a prism inserted in the path of the light rays and capable, when being displaced, of giving them a sufficient bias. The means used to obtain the automatic slowing down of the speed of the machine could also be different from those which have been described, for instance a photo-electric device similar to that described above.

The auxiliary scale and its sliding index could also be disposed on the underframe, while an organ fixed on the table would operate the speed reduction device of the latter by the intermediary of the sliding index.

Having thus described the object of the invention, what is claimed to be new is the following:

1. In a precision machine-tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, and finely a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position and to stop it automatically in this position.

2. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, the unit intervals of the latter being realized by identical groups of several lines, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position and to stop it automatically in this position.

3. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, the unit intervals of the latter being realized by identical groups of several lines which are not equidistant, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position, and to stop it automatically in this position.

4. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, the sliding index being so arranged that the sliding speed of the table can be reduced automatically in at least two phases in proximity to its working position, a precision setting device comprising a fine graduation, a photo-electric cell facing the latter, between both of them a grid whose opaque and open to light spaces correspond to the tracing of the fine graduation, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position and to stop it automatically in this position.

5. In a precision machine tool with motor and comprising at least one sliding table which can be brought into a predetermined working position by imparting to it first a fast motion followed by a slow motion, an auxiliary scale mounted on the table, a sliding index along said scale, an organ mounted on the frame and operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position and to stop it automatically in this position.

6. In a precision machine tool with motor and comprising at least one sliding table which can be brought into a predetermined working position by imparting to it first a fast motion followed by a slow motion, an auxiliary scale mounted on the frame, a sliding index along said scale, an organ mounted on the table and operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, the whole with the purpose to reduce automatically the driving speed of the motorized table, when the latter comes near to its working position and to stop it automatically in this position.

7. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, a second precision graduation cooperating with a sighting microscope for the determination of the initial position of the table, the whole with the purpose to reduce automatically the driving speed of the motorized table, when the latter comes near to its working position and to stop it automatically in this position.

8. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, and finally a source of light producing a beam which, after having passed the graduation and the grid acts on the cell; a control operated by the latter to stop the table automatically exactly in the required position, and a mechanism enabling to bias the setting device in order to take into account the fractions of units in the precision setting, a hand drive of the sliding table to bring it into initial position, the whole with the purpose to reduce automatically the driving speed of the motorized table, when the latter comes near to its working position and to stop it automatically in this position.

9. In a precision machine tool with motor and comprising at least one sliding table which can be brought into a predetermined working position by imparting to it first a fast motion followed by a slow motion, an auxiliary scale, a sliding index along said scale, an organ operated by said sliding index to control the change-over gear of the table from fast to slow motion, a precision setting device comprising a fine graduation, a photo-electric cell facing the latter, between both of them a grid whose opaque and open to light spaces correspond to the tracing of the fine graduation, the unit intervals of the latter being realized by identical groups of several lines, and finally a source of light producing a beam which, after having passed the graduation and the grid acts on the cell; a control operated by the latter to stop the table automatically exactly in the required position, the cell being interlocked with the organ operated by the sliding index so that said cell cannot stop the table before having sighted the last unit group but one on the fine graduation, and a mechanism enabling to bias the setting device in order to take into account the fractions of units in the precision setting, the whole with the purpose to reduce automatically the driving speed of the motorized table, when the latter comes near to its working position and to stop it automatically in this position.

FERNAND TURRETTINI.